April 23, 1968
C. S. MERTLER
3,379,845
FLUID OPERATED THERMOSTAT
Filed Oct. 22, 1965
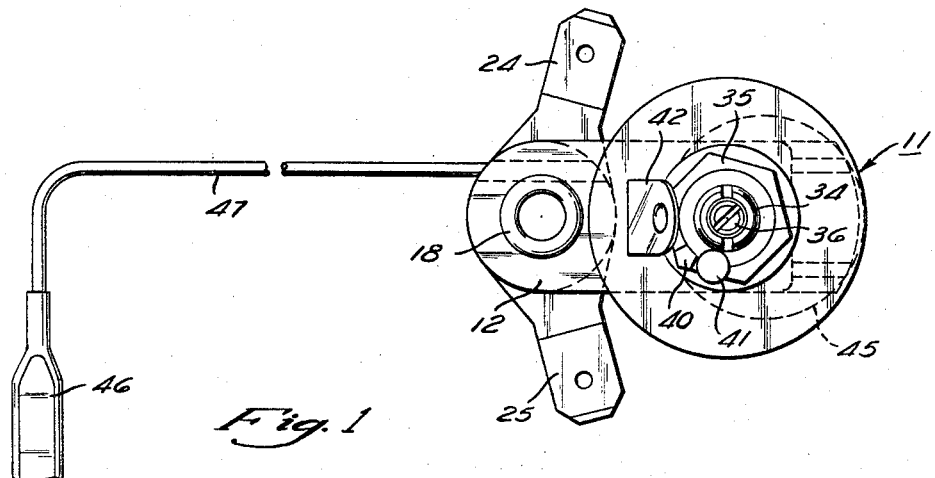
Fig. 1
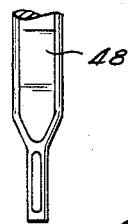
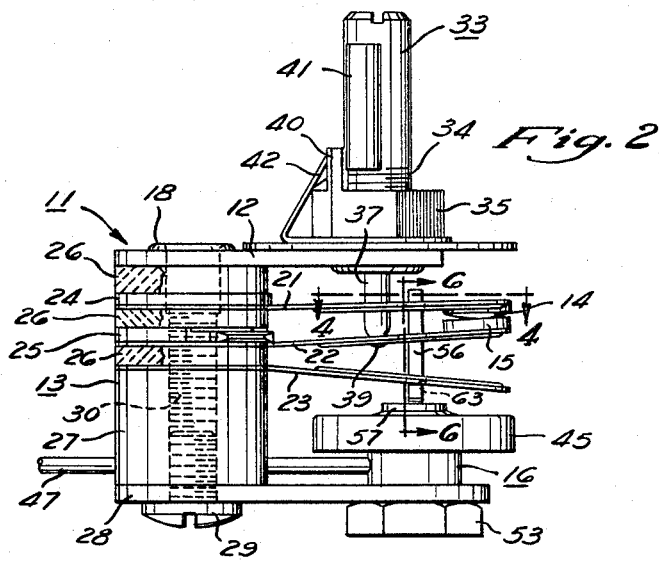
Fig. 2
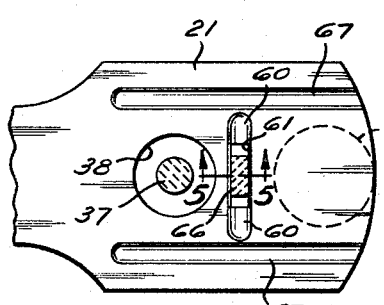
Fig. 3
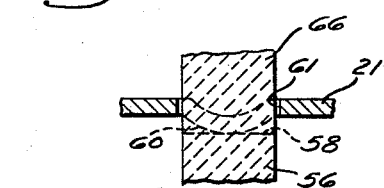
Fig. 4
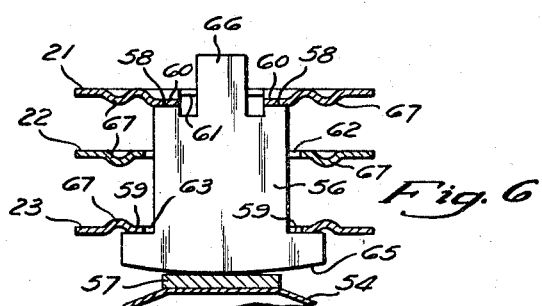
Fig. 5
Fig. 6
INVENTOR.
CHARLES S. MERTLER
BY Woodling, Krost,
Granger and Rust
ATTORNEYS United States Patent Office 3,379,845
Patented Apr. 23, 1968

3,379,845
FLUID OPERATED THERMOSTAT
Charles S. Mertler, Mansfield, Ohio, assignor, by mesne assignments, to Essex Wire Corporation, Fort Wayne, Ind., a corporation of Michigan
Filed Oct. 22, 1965, Ser. No. 500,980
10 Claims. (Cl. 200—140)

ABSTRACT OF THE DISCLOSURE

The invention relates to a fluid operated thermostat of the stack type wherein an expansible fluid acts on a diaphragm which in turn acts through a link guided by a cantilever blade in a plural blade stack type of thermostat. The link is guided and supported for only line contact to minimize friction and hence the inertia and thermal and physical mass is minimized for a minimum temperature differential.

---

The invention relates in general to fluid operated thermostats and more particularly to a fluid operated thermostat of the stack type which has a minimum of friction of the moving parts.

Many prior art thermostats have been operated by fluid pressure of a fluid expandable with temperature changes for example with increased temperature but in general these thermostats have been of the type wherein the mechanism was in a case or housing and the parts of the thermostatic switch were mounted inside this housing. This type of thermostat may often be unsatisfactory where the thermostat is separately manufactured rather than being built into an appliance by the manufacturer of both the thermostat and the appliance. Also, often such thermostats were bulky and relatively insensitive where the separate thermostatic switch was that being marketed for use in any type of appliance. Also the bulkiness of the thermostat contributed to the inertia and mass of the parts to be moved by the fluid under pressure, and this means that the temperature differential between on and off conditions of the thermostat was rather large. Further the force required to move these rather large parts was also large, requiring a large expansion bulb which was subjected to the temperature changes, and this large expansion bulb accordingly introduced a large thermal mass which was relatively slow to respond to temperature changes. This still further increased the temperature differential of the thermostat.

Accordingly an object of the invention is to obviate the above mentioned disadvantages.

Another object of the invention is to provide a fluid operated thermostat with relatively low thermal mass and relatively low mass and inertia of parts to be moved in order to create a sensitive thermostat with a small temperature differential.

Another object of the invention is to provide a fluid operated thermostat of the stack type so that the entire thermostatic switch is self-contained without necessity of a case or housing to contain the switch apparatus.

Another object of the invention is to provide a hydraulic or fluid operated thermostat of the stack type wherein a relatively low friction of moving parts is achieved to create a thermostat with a small temperature differential.

Another object of the invention is to provide a fluid operated thermostat with a line contact between moving parts despite changing attitudes of the various parts in order to achieve a thermostat with a minimum friction.

The invention may be incorporated in a fluid operated thermostat comprising, in combination, a base, a stack carried on said base, first and second contacts, means including a first blade mounted in said stack and carrying said first contact, means mounting said second contact for mutual cooperation with said first contact, fluid pressure means to adjust the position of said first contact with changes of temperature, said fluid pressure means including a fluid pressure chamber containing a fluid expandable with temperature changes mounted relative to said base and including a movable diaphragm having an axis of movement, link means, guide means to maintain said link means in a position to be acted on by said diaphragm at a substantially fixed distance from said stack, and means to maintain said link means acting on said first blade despite cantilever bending of said first blade and changes in attitude of said first blade with changes of temperature.

Other objects and a fuller understanding of the invention may be had by referring to the following description and claims, taken in conjunction with the accompanying drawing, in which:

FIGURE 1 is a plan view of a thermostat embodying the invention;

FIGURE 2 is a side elevational view of the thermostat of FIGURE 1;

FIGURE 3 is an end view of the expansion bulb of FIGURE 1;

FIGURE 4 is an enlarged sectional view on line 4—4 of FIGURE 1;

FIGURE 5 is an enlarged sectional view on line 5—5 of FIGURE 4; and,

FIGURE 6 is a partial view to an enlarged scale on line 6—6 of FIGURE 2.

The figures of the drawing illustrate a thermostat 11 embodying the invention. The drawing illustrates the preferred embodiment but not the only embodiment, the invention being limited only by the appended claims.

The thermostat 11 includes generally a base 12, a stack 13, first and second contacts 14 and 15, respectively, and fluid pressure means 16. The base is a rigid base and at one end thereof the stack 13 is mounted. The stack is composed of various layers of insulation, contact blades, and terminals and has a first end fastened to the base 12 by means of a rivet 18. First, second, and third blades 21, 22, and 23 each have first and second ends with the first ends mounted in that order in the stack 13. The first and second blades 21 and 22 may be termed contact blades and the third blade 23 may be termed guide means or a guide blade. Contact 14 is carried on the outboard end of contact blade 21 and the second contact 15 is carried on the outboard end of the second contact blade 22. A terminal 24 is mounted in the stack 13 in electrical connection with the first blade 21 and a terminal 25 is mounted in the stack 13 in electrical connection with the second blade 22. Insulating washers 26 insulate the blades 21 and 22 from the stack and from each other. A metal spacer 27 and an auxiliary base 28 are also mounted in the stack, for example, by a screw 29 received in a threaded interior bore 30 of the rivet 18.

An adjustment means 33 is provided in the thermostat 11 to adjust the relative positions of the contacts 14 and 15. The natural resiliency of these resilient blades 21 and 22 and the mounting thereof in the stack 13 urges these contacts 14 and 15 together for mutual engagement in the absence of external forces. The adjustment means 33 includes an adjusting screw 34 threaded in a nut 35 fixed on the base 12. The adjusting screw 34 may also include an interior trimmer screw for fine adjustment of the axial position of an insulator extension 37 which passes through a large aperture 38 in the first blade 21 and bears in a socket 39 in the second blade 22. By adjustment of the position of the screw 34 the insulator extension 37 moves axially to achieve the cantilever bending of the second blade 22 through an arc and accordingly adjusts the position of the second contact 15. A stop lug 40 on the nut 35 and a stop boss 41 on the adjusting screw 34 cooperate to limit the rotation of the screw 34 to about 300 degrees. A spring detent 42 may also cooperate with the stop boss 41 just prior to reaching one rotational limit to give a tactile indication of the fact that the off condition region of the contacts 14 and 15 has been reached. This will be with the screw rotated to its counterclockwise limit as viewed in FIGURE 1 and with a left hand thread on screw 34, the contact will have been moved downwardly to a down limit position as viewed in FIGURE 2.

The fluid pressure means 16 includes a fluid pressure chamber 45 and an expansion tube which generally includes a capillary tube 47 and an optional expansion bulb 46, the three connected to make a hermetically sealed combination. A fluid such as a liquid or partial liquid and gas which is expandable with heat fills this hermetically sealed combination of chamber 45, bulb 46, and tubing 47. The expansion bulb 46 may have a flattened surface 48 so that the expansion bulb 46 may be clamped against a flat surface to be heated by a heater controlled by the contacts 14 and 15. For example, this may be an electrical heater 50 with energization for the heater controlled by the contacts 14 and 15 and the heater heating an appliance 49 from which the expansion bulb 46 receives heat.

The fluid pressure chamber 45 has a shank received through an aperture in the auxiliary base 28 and secured thereto by a nut 53. The fluid pressure chamber 45 has a movable wall or diaphragm 54 which moves along an axis with changing fluid pressure brought about by the changing temperature of the expansion bulb 46. This axis of movement is vertical in FIGURE 2 and is disposed generally parallel to the axis of movement of the adjusting screw 34 and also generally perpendicular to the contact blade 21. The fluid pressure chamber 45 is mounted so that this axis of movement lies between the adjusting screw 34 and the contacts 14 and 15 in a direction longitudinally of the blade 21.

A link 56 interconnects the diaphragm 54 and the first blade 21 in order to move the first contact 14 with temperature changes. This link 56 is preferably an insulator push link and is separate from the diaphragm 54 and the contact blade 21. The diaphragm 54 may have a wear pad 57 fastened thereto to prevent undue wear on the relatively thin diaphragm 54. This insulator link 56 may be made from any suitable insulation material, for example, a ceramic material. The link 56 has first shoulders 58 and second shoulders 59. The first shoulders 58 bear against generally cylindrically shaped raised ridges 60 on the underside of the first blade 21. The surfaces of the first shoulders 58 are preferably planar and thus this contact is only a line contact despite changing attitudes between the insulator link 56 and the first blade 21 throughout the temperature range achieved by adjustment of the screw 34. It will be observed that the blade 22 is moved by cantilever bending through an arc to achieve adjustment throughout a temperature range. Also the movement of the diaphragm 54, which may be about .050", will move the first contact blade 21 by cantilever bending throughout this same temperature range. Despite this arc of movement, only a line contact is maintained between the shoulder 58 and the raised ridges 60 on the first blade 21.

The insulator link 56 passes through an aperture 61 in blade 21, an aperture 62 in blade 22, and an aperture 63 in blade 23. The apertures 61 and 63 closely receive the insulator link in a direction longitudinally of the respective blades. For example, this might be within about .005". The closeness of the aperture 61 is illustrated in FIGURE 5. The link 56 fits within the aperture 63 in the blade 23 in a similar manner. The aperture 62 in blade 22 is larger and does not closely receive the insulator link 56 so as to not obstruct free movement of the link 56. The bottom of the insulator link 56 preferably has a surface 65 with a large radius of curvature, so as to abut the wear pad 57 with a line contact. Also a tongue extension 66 of the insulator link 56 is that which extends through the aperture 61 in blade 21. The blades 21, 22, and 23 may have longitudinal stiffening ridges 67 to stiffen these blades so that the effective hinge point is close to the stack 13.

The insulator link 56 also has shoulders 59 on the other end of the link 56 bearing against the guide blade 23. The shoulders 58 and 59 face in the same direction and accordingly both shoulders push against the blades 21 and 23 in the same direction. The guide blade 23, because it acts on the shoulders 59, retains the link 56 in engagement with the diaphragm 54. The natural resiliency of the resilient blade 23 and the mounting in stack 13 acts downwardly as viewed in FIGURE 2 to urge the insulator link 56 against the diaphragm 54. The fact that the insulator link 56 is closely received in a longitudinal direction of blade 23 in the aperture 63, maintains the insulator link 56 at a substantially constant distance from the stack 13. This assures that the diaphragm 54 always acts in the same way on insulator link 56 to maintain constancy of calibration of the thermostat.

The line contact of abutment between link surface 65 and the wear pad 57, together with the link contacts at shoulders 58 with the raised ridges 60 of contact blade 21 provide a three point suspension of the link 56. This assures that even though all the blades 21, 22, and 23 may not be perfectly aligned longitudinally, nevertheless the blade 21 always retains the same planar attitude, and the link 56 does not shift laterally as viewed in the end view of FIGURE 6, throughout its range of movement up and down. This assures constancy of the calibrated temperature at which the contacts will open and close.

*Operation*

The FIGURE 2 illustrates the thermostat 11 in its highest adjusted temperature setting, assuming that the fluid in chamber 45 expands with heat and that the contacts open on temperature rise. With the adjusting screw turned counterclockwise so that stop boss 41 engages the other side of stop lug 40, the left hand thread of screw 34 will move contact 15 downwardly to an off position at the lowest temperature setting. With the contacts closed, as viewed in FIGURE 2, energization will be supplied to the heater 50 to heat the appliance 49. This heat will be transmitted to the expansion bulb 46 and cause expansion of the fluid therein. This will move the diaphragm 54 upwardly and this movement is transmitted through the link 56 to blade 21 and contact 14. This will move the contact 14 upwardly to open the electrical circuit and deenergize the heater 50. Upon cooling of the appliance 49 and expansion bulb 46 the contacts will reclose to again actuate the heating portion of the cycle of operation. It has been found that this thermostat 11 is one with a sufficiently low friction of moving parts that the temperature differential of the appliance at the flattened surface 48 of the bulb 46 will be only one degree F. or less. This low friction is achieved by the insulator link 56 being separate from both the diaphragm 54 and the contact blade 21. As the diaphragm 54 moves up and down with temperature changes this motion is transmitted to contact 14 with a minimum of friction on the interlinking parts. The shoulders 58 ride on the raised ridges 60 of contact blade 21 to maintain only a line contact and also a line contact is maintained between link surface 65 and wear pad 57. These line contacts have practically no friction and thus a maximum efficiency of transfer of forces from the diaphragm 54 to contact 14 is achieved. This is a definite improvement over those prior art thermostats which had some linkage solidly attached to a moving part which frictionally scraped over a surface, for example, during cantilever bending of a blade, to achieve movement of a contact. Because of the high efficiency of transfer of forces a smaller expansion bulb 46 and fluid pressure chamber 45 may be used for the same contact rating, or alternatively a larger contact rating may be achieved with the same size bulb 46 and chamber 45. With the smaller parts being used there is a smaller thermal mass to be heated and thus the entire thermostat 11 is more responsive to temperature changes, contributing to small temperature differentials. The diaphragm 54 has an axis of movement disposed so that the insulator link 56 acts on the first blade 21 inboard of the contact 14. This provides amplification of movement of contact 14 relative to the movement of the diaphragm 54. Accordingly this also narrows the temperature differential of the entire thermostat 11.

The thermostat 11 is preferably embodied as shown in a stack type thermostat, which achieves a self-contained thermostat without resorting to a case or housing. The stack type thermostat materially increases the usefulness of the thermostat and its possible applications, as opposed to a thermostat embodied in a housing which is often bulkier and less versatile in connection with many appliances.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A fluid operated temperature responsive thermostatic switch comprising, in combination,
    a base,
    a laminated stack carried on said base,
    first and second contacts,
    means including a first blade mounted in said stack and carrying said first contact,
    means mounting said second contact for mutual cooperation with said first contact,
    fluid pressure means to adjust the position of said first contact with changes of temperature,
    said fluid pressure means including a fluid pressure chamber containing a fluid expandable with temperature changes mounted relative to said base and including a movable diaphragm having an axis of movement, link means,
    guide means to maintain said link means in a position to be acted on by said diaphragm at a substantially fixed distance from said stack,
    and means coacting between said link means and said first blade to maintain said link means acting on said first blade at substantially said fixed distance from said stack despite cantilever bending of said first blade and changes in attitude of said first blade with changes of temperature.

2. A thermostat as claimed in claim 1, including an auxiliary base carried on the opposite end of said stack from said first mentioned base,
    and means mounting said fluid pressure chamber on said auxiliary base with the axis of movement of said diaphragm disposed generally perpendicularly to said first blade.

3. A thermostat as claimed in claim 1, including a second blade mounted in said stack and carrying said second contact, adjustment means to bend said second blade to adjust the position of said second contact for a variable temperature range of operation of said thermostat,
    said link means being separate from said first blade and from said diaphragm and acting between same,
    and said guide means maintaining said link means in position to be acted on by said diaphragm despite changing positions of said link means due to deflection of said first contact blade throughout said temperature range of operation.

4. A thermostat as claimed in claim 3, wherein said guide means includes a guide blade mounted as a cantilever in said stack and having an aperture embracing said link means,
    and a shoulder on said link means engaging said guide blade.

5. A thermostat as claimed in claim 1, wherein said link means is separate from said first blade and from said diaphragm,
    and means maintaining a three point suspension of said link means between said diaphragm and said first blade.

6. A fluid operated thermostat comprising, in combination,
    a base,
    a stack carried on said base,
    first and second contacts,
    means including a first blade mounted in said stack and carrying said first contact,
    means mounting said second contact for mutual cooperation with said first contact,
    means to adjust the position of said second contact throughout a given temperature range,
    fluid pressure means to adjust the position of said first contact with changes of temperature,
    said fluid pressure means including a fluid pressure chamber mounted relative to said base and including a movable wall having an axis of movement,
    said axis of movement being disposed generally perpendicularly to said first blade,
    an expansion tube connected to said fluid pressure chamber and the combination containing a fluid expandable with temperature changes to act on said movable wall,
    link means,
    means to maintain only a line contact between said link means and said first blade including a rounded surface on said first blade,
    means to maintain said link means in a position to be acted on by said movable wall at a substantially fixed distance from said stack,
    and means including an aperture in said first blade closely receiving said link means to maintain said link means in only said line contact despite cantilever bending of said first blade and despite changes in attitude of said first blade throughout said given temperature range.

7. A fluid operated thermostat comprising, in combination,
    a base,
    a stack carried at one end thereof on said base,
    first and second blades each having first and second ends with said first ends mounted in said stack,
    first and second contacts carried on said second ends of said first and second blades, respectively, for mutual cooperation,
    means to adjust the position of said second contact by cantilever bending of said second blade relative to said base throughout a given temperature adjustment range,
    a fluid pressure chamber including a movable diaphragm and mounted fixed relative to said base with the axis of movement of said diaphragm being disposed generally perpendicular to said first blade,
    tubing connected to said fluid pressure chamber and the combination thereof containing a fluid expandable with heat,
    insulator link means separate from said diaphragm and from said first blade,
    means including a guide blade guiding movement of said insulator link means and to maintain said diaphragm acting on said insulator link means, means including a curved surface on said first blade maintaining only a line contact engagement between said first and said insulator link means, and a surface defining an aperture in said guide blade to closely receive said insulator link means to retain said link means substantially along said axis of movement of said diaphragm despite changing attitudes of line contact engagement between said insulator link means and said first blade with temperature changes throughout said given temperature adjustment range.

8. A fluid operated thermostat comprising, in combination, a base, a stack carried at one end thereof on said base, first and second blades each having first and second ends with said first ends mounted in said stack, first and second contacts carried on said second ends of said first and second blades, respectively, for mutual cooperation, means to adjust the position of said second blade, a temperature variable fluid pressure chamber including a movable diaphragm mounted fixed relative to said base with the axis of movement of said diaphragm being disposed generally perpendicular to said first blade, tubing connected to said fluid pressure chamber and the combination thereof containing a fluid expandable with heat, an insulator link disposed along said axis of movement of said diaphragm between said diaphragm and said first blade, and means to maintain said insulator link acting on said first blade at substantially the same distance from said stack despite cantilever bending of said first blade and changes in attitude of said first blade with changes of temperature whereby upon temperature change of said fluid the same changes volume and acts on said diaphragm to move same to move said first contact relative to said second contact.

9. A fluid operated thermostat comprising, in combination, a base, a stack carried at one end thereof on said base, a contact blade and a guide blade disposed in that order from said base and each having first and second ends with said first ends mounted in said stack, a first contact carried on said second end of said contact blade, a second contact, means mounting said second contact for cooperation with said first contact, an auxiliary base carried on the other end of said stack, a fluid pressure chamber including a movable diaphragm mounted on said auxiliary base with the axis of movement of said diaphragm being disposed generally perpendicular to said contact blade, tubing connected to said chamber with the combination thereof containing a fluid expandable with heat, an insulator push link disposed along said axis of movement of said diaphragm, first and second shoulders on opposite ends of said push link and pushing in the same direction against said contact and guide blades, surfaces defining apertures in said contact and guide blades to closely receive said insulator push link to retain said push link substantially along said axis of movement of said diaphragm, a raised ridge on said contact blade engaging said first shoulder on said insulator push link along only a line contact despite changing attitudes of said contact blade and said insulator push link, and said guide blade being biased to act against the respective shoulder on said push link and hold said push link against said diaphragm, whereby upon temperature change the fluid changes volume and acts on said diaphragm to move same toward said contact blade and to push thereon to move said first contact away from said second contact.

10. A fluid operated thermostat comprising, in combination, a base, a stack carried at one end thereof on said base, first, second, and third blades disposed in that order from said base and each having first and second ends with said first ends mounted in said stack, means to mutually insulate said first and second blades in said stack, first and second contacts carried on the second ends of said first and second blades, said first and second blades being mutually biased toward each other to attempt to cause engagement between said first and second contacts, adjusting means carried on said base and acting on said second blade to adjust the position thereof, an auxiliary base carried on the other end of said stack, a fluid chamber including a movable diaphragm mounted on said auxiliary base with the axis of movement of said diaphragm being disposed parallel to said adjusting means, tubing connected to said chamber with the combination thereof containing a fluid expandable with heat, an insulator push link disposed along said axis of movement of said diaphragm, first and second shoulders on opposite ends of said push link and pushing in the same direction against said first and third blades, surfaces defining apertures in said first, second, and third blades to receive said insulator push link and with the apertures in said first and third blades closely receiving said push link to retain said push link substantially along said axis of movement of said diaphragm, and said third blade being biased to act against the respective shoulder on said push link and hold said push link against said diaphragm, whereby upon temperature change said fluid changes volume and acts on said diaphragm to move same toward said first contact blade and to push thereon to move said first contact away from said second contact.

References Cited

UNITED STATES PATENTS

| | | | |
|---|---|---|---|
| 3,304,385 | 2/1967 | Vollbehr | 200—83 |
| 2,941,055 | 6/1960 | Sussin | 200—83 |
| 2,814,686 | 11/1957 | Wilder | 200—138 X |
| 3,096,419 | 7/1963 | Howell | 200—140 |
| 3,207,876 | 9/1965 | Mertler | 200—139 X |
| 3,221,124 | 11/1965 | Mertler | 200—139 X |
| 3,236,977 | 2/1966 | Huffman | 200—139 X |

BERNARD A. GILHEANY, *Primary Examiner.*

H. B. GILSON, *Assistant Examiner.*